United States Patent [19]

Coussau

[11] Patent Number: 4,844,859
[45] Date of Patent: Jul. 4, 1989

[54] REMOVABLE AND LOCKABLE GUIDE RING IN AN ORIFICE PASSING THROUGH A PLATE AND ITS USE FOR A GUIDE TUBE OF A NUCLEAR REACTOR

[75] Inventor: Jean Coussau, Paris, France

[73] Assignee: Framatome, Courbevoie, France

[21] Appl. No.: 870,576

[22] Filed: Jun. 4, 1986

[30] Foreign Application Priority Data

Jan. 24, 1986 [FR] France .................. 86 01040

[51] Int. Cl.⁴ .................. G21C 7/00; F16B 9/02
[52] U.S. Cl. .................. 376/353; 376/463; 285/320; 285/162; 285/210; 285/319; 403/197
[58] Field of Search .................. 376/353, 463; 285/162, 285/210, 209, 208, 318, 319, 317; 403/320, 194, 197, 195, 194, 207

[56] References Cited

U.S. PATENT DOCUMENTS

| | | | |
|---|---|---|---|
| 522,005 | 6/1894 | Burke | 285/210 |
| 608,174 | 8/1898 | Byrnes | 285/210 |
| 3,041,089 | 6/1962 | Purves | 285/320 |
| 3,250,551 | 5/1966 | Draupt | 285/162 X |
| 4,231,843 | 11/1980 | Myron et al. | 376/353 X |
| 4,637,914 | 1/1987 | Boyle et al. | 376/352 X |
| 4,751,042 | 6/1988 | Ales et al. | 376/353 |

FOREIGN PATENT DOCUMENTS

| | | | |
|---|---|---|---|
| 98774 | 1/1984 | European Pat. Off. | 376/353 |
| 2515306 | 4/1983 | France | 285/318 |

Primary Examiner—John S. Maples
Attorney, Agent, or Firm—Pollock, Vande Sande & Priddy

[57] ABSTRACT

Removable and lockable guide ring in an orifice passing through a plate and its use for a guide tube of a nuclear reactor. The guide ring comprises a tubular body (25), one part (25a) of which is introduced into the orifice (22) in the plate (20). A second part (25b) of the tubular body (25) comes up against the plate (20), and claws (40) having the form of being levers, for attaching the ring (21) to the edges of the orifice (22), are mounted freely in the tubular body (25). A spring (45) makes it possible to return the claws (40) into the attachment position. The invention applies particularly to a guide tube of a pressurized-water nuclear reactor.

8 Claims, 3 Drawing Sheets

REMOVABLE AND LOCKABLE GUIDE RING IN AN ORIFICE PASSING THROUGH A PLATE AND ITS USE FOR A GUIDE TUBE OF A NUCLEAR REACTOR

FIELD OF THE INVENTION

The invention relates to a removable and lockable guide ring in an orifice passing through a plate and, more particularly, to a guide ring associated with a guide tube of a nuclear reactor.

BACKGROUND OF THE INVENTION

In nuclear reactors which have power and shutdown control rods, it is known to use tubes not only to guide the rods themselves which are in the form of clusters, but also to guide the shaft connecting the cluster to the mechanisms controlling the translational movement of the rods. This shaft, called a follower, is centered and guided in a tube arranged in the space contained between the tubes guiding the clusters and the wall of the containment carrying the mechanisms moving the control rods.

Arranged in a known way in the end part of the tube is a ring which ensures, on the one hand, the guidance of the follower and, on the other hand, the limitation of the flow of coolant which has passed through the core of the nuclear reactor. The stream of coolant is thus made to flow off via the orifices provided in the cluster guide tubes for it to pass through.

Furthermore, during the operations of unloading and refuelling the reactor core, the ring associated with the guide tube makes it possible to guide the corresponding follower, in such a way that, when the cover of the vessel is lowered, this follower can enter the corresponding passage provided in the cover.

Finally, this ring must be removable, in order to make it possible to carry out the conventional maintenance operations on the components of the core of the nuclear reactor, and must be lockable relative to the guide tubes, so that it is maintained in a fixed position during the normal operation of the reactor.

There are known embodiments, in which the ring is held in an orifice passing through the end plate of the guide tube, in such a way as to be coaxial relative to this orifice, by maneuverable attachment means retained in place by an elastic means. The guide ring comprises a tubular body, whose first part enters the orifice in the end plate of the guide tube and whose second part comes up against the upper face of this plate. The attachment means mounted on the tubular body engage with the edges of the orifice in the plate on the lower face of the latter.

The tubular body of the guide ring consists of two coaxial rings, of which one, the inner ring, is mounted slideably in the axial direction inside the other which forms the outer ring. The internal bore in the inner ring forms the guide surface for the follower. The outer ring carries the locking means which usually consist of attachment fingers mounted pivotably about horizontal axes, and the inner ring has, on its outer surface, surfaces actuating the pivoting fingers, these surfaces being designed to put these fingers into the locked or released position as a result of the axial displacement of the inner ring. An elastic means, such as a spring, is inserted between the outer ring and the inner ring, so as to exert a restoring force on the inner ring, to maintain it in the position corresponding to the locking of the fingers.

The disadvantage of such guide rings is that they consist of two parts movable relative to one another and require the use of a special tool to exert a thrust on the inner ring, to ensure the release of the fingers at the moment when the guide ring is fitted on the end plate of a guide tube.

SUMMARY OF THE INVENTION

The object of the invention is, therefore, to provide a removable and lockable guide ring in an orifice passing through a plate, so that the internal bore of the guide ring and the orifice in the plate are coaxial relative to one another, and comprising a tubular body entering the orifice in the plate by means of a first part and coming up against one of the faces of the plate round the orifice by means of a second part, means of attaching the ring to the edges of the orifice on the face of the plate opposite the bearing face of the tubular body, and an elastic means of returning the attachment means into the attachment position for locking the ring in the orifice in the plate, this guide ring of simple structure having to comprise a tubular body without a movable part, which can be fitted and locked in the orifice in the plate in a simple way and without a special tool.

To achieve this object, the attachment means consists of at least two claws taking the form of a bent lever having a first arm, the end of which has an attachment surface, and a second arm forming a certain angle with the first arm, the claws being mounted freely relative to the tubular body and being retained in this tubular body by the elastic means consisting of at least one spring inserted between one part of the tubular body and the second arm of the claws, so as to push the attachment ends of the claws back in the radial direction towards the outside of the tubular body.

BRIEF DESCRIPTION OF THE DRAWINGS

In order that the invention may be more clearly understood, an embodiment of a guide ring according to the invention, used for a guide tube of a pressurized-water nuclear reactor, will now be described by way of example, with reference to the accompanying drawings.

DESCRIPTION OF PREFERRED EMBODIMENT

Figure 1:
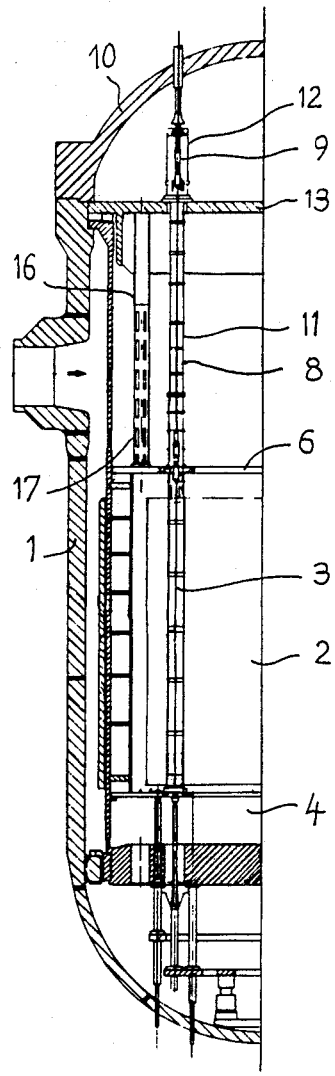
FIG. 1 is a sectional half-view through a vertical plane of the vessel and of the internal equipment of a nuclear reactor.

FIG. 1 shows the vessel 1 of a pressurized-water nuclear reactor, inside which is arranged the reactor core 2 consisting of a set of fuel assemblies 3 arranged vertically and resting on the lower core plate 4 by means of their bottom end fittings.

Located above the core 2 is the upper core plate 6 which is perforated with orifices, each level with a respective fuel assembly, and on which rest the guide tubes 8 arranged vertically above some of the core assemblies.

Placed above the hemispherical cover 10 of the vessel 1 are mechanisms (not shown) for moving control rods in the form of a cluster, which are connected to the lower end of drive shafts 9 on which the action of the mechanisms for moving the control rods is exerted.

The control rods can move inside the fuel assemblies 3, in tubes which replace certain fuel pencils in the network of these assemblies, in order to control the reactivity of the core 2.

Figure 2:
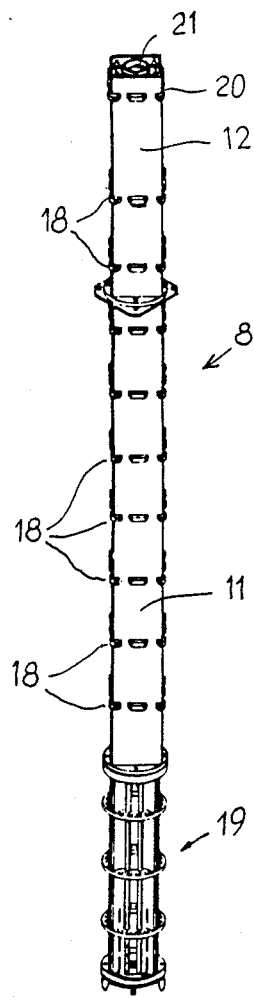
FIG. 2 is an elevation view of an assembly for guiding a control rod and its follower.

As can be seen in more detail in FIG. 2, the guide tubes 8 are composed of a lower part 11, hereinafter called a guide, resting on a support plate 13 parallel to the upper core plate 6 and engaged in the core plate 6, and of an upper part 12, hereinafter called a tube, fastened to the support plate 13.

The support plates 6 and 13 are connected to one another by means of tubular spacers 16 perforated with orifices 17 for the circulation of cooling fluid consisting of the pressurized water filling the reactor vessel. By means of these spacers 16, the upper internal equipment forms a rigid assembly integral with the support plate 13.

Arranged inside each of the guide tubes 8 and over their entire upper part are discontinuous guide devices consisting of perforated plates 18 located at a uniform distance from one another over the length of the guide 11 and in the lower part of the tube 12.

The bottom part 19 of the guide 11 forms a device for the continuous guidance of the control rods, with perforations which are in the extension of the perforations of the discontinuous devices 18.

The part 19 of the guide consists of sleeves occupying the entire height of the zone 19 and having vertical channels guiding the control rod. This zone 19, without a tubular casing, thus allows most of the coolants fluid which has passes through the adjacent fuel assemblies 3 to mix with the portion of coolant fluid circulating via the orifices 17, so as to be directed towards a steam generator (not shown).

If the zone 19 has a tubular casing, it is obvious that lateral orifices will be made in this casing to allow the coolant fluid to be discharged.

The control rods consist of a cluster of absorbent pencils which are connected in their upper part by means of a crossbrace or a spider support, itself connected to the lower part of the drive shafts of the follower 9.

Arranged in the upper part of the tube 12 is a plate 20 which has a guide ring 21. As explained above, this ring 21 must be removable, so that, during maintenance operations on the equipment, it allows the passage of the end part of the follower 9 which has a larger cross-section in the region of its connection to the spider support of the clusters.

Nevertheless, during operation, this ring 21 must ensure the guidance of the follower 9, to prevent the latter from experiencing substantial lateral movements which would risk causing faulty insertion of the control clusters. The ring 21 also has to perform the function of a flow restrictor, to prevent the portion of coolant present in the guide tube 8 from escaping into the space contained between the upper plate 13 and the vessel cover 10. The ring 21 must therefore be firmly locked on the plate 20 inside its orifice.

Figure 3:
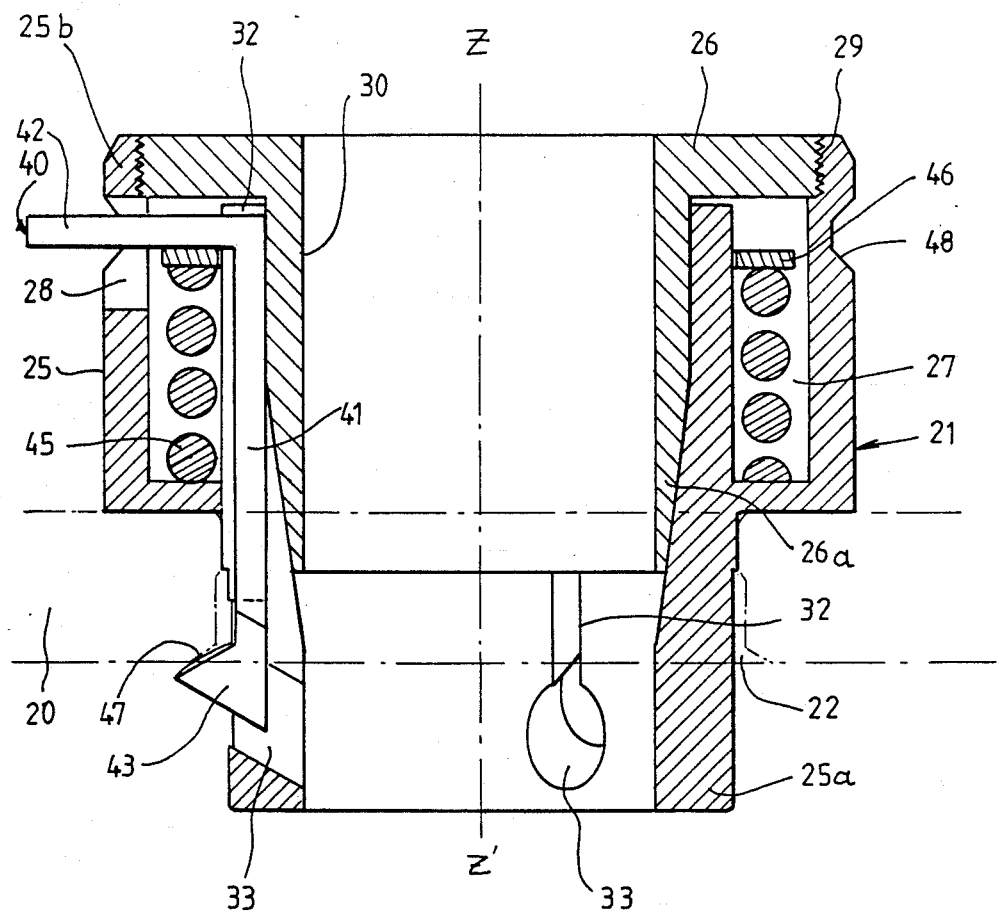
FIG. 3 is a sectional view, in a vertical plane of symmetry, of a guide ring according to the invention, is its position locked on the end plate of a guide tube.

FIG. 3 shows the guide ring 21 in the locked position inside the orifice 22 in the end plate 20 of a tube 12.

This guide ring comprises a tubular body 25, whose lower part 25a is engaged in the orifice 22 and the upper part 25b rests on the upper face of the plate 20.

In its upper part 25b, the tubular body 25 has an annular recess 27 and three ports 28 arranged at 120°, only one of which has been shown in FIG. 3.

A closing piece 26 having an external thread is screwed into a corresponding tapping 29 machined in the inner surface of the tubular body 25. This closing piece 26, fastened rigidly to the part 25b of the tubular body, forms an integral part of the guide ring and has an internal bore 30 which ensures the guidance of the follower and restriction of the flow at the outlet of the guide tube. The piece 26 also ensures that the annular recess 27 is closed off. The lower part 26a of the closing and guide piece 26 has a frusto-conical surface which comes in contact with a corresponding frusto-conical surface machined on the inner surface of the tubular body 25, when these two parts are joined together rigidly. This ensures perfect centering of the piece 26 in the tubular body 25 and consequently in the orifice 22 in the plate 20 of the tube 12. The axis ZZ' of the guide ring then coincides with the axis of the orifice 22 which itself coincides with the axis of the guide tube and of the corresponding fuel assembly.

Figure 4:
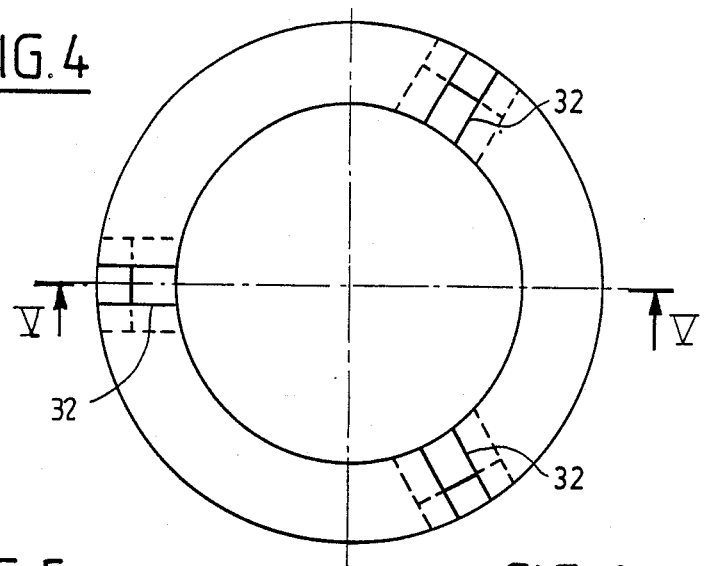
FIG. 4 is a partial cross-sectional view of the part of the tubular body of the guide ring engaged in the orifice.
Figure 5:
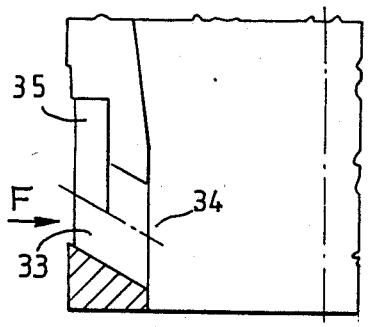
FIG. 5 is a view in section along line V—V of FIG. 4.
Figure 6:
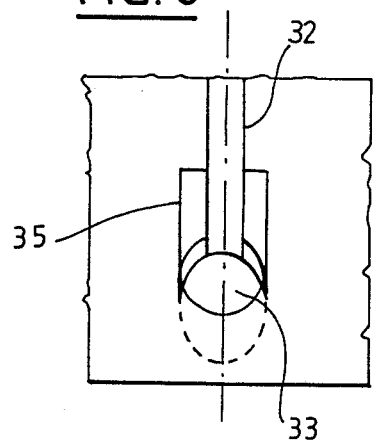
FIG. 6 is a view in direction F of FIG. 5.

As can be seen in FIGS. 3 and 4, the lower part 25a of the tubular body has three grooves 32 at 120°, which pass through its wall over its entire thickness. These grooves 32 extend towards the top of the tubular body 25, up to the upper part of the inner wall of the annular recess 27, opening into this recess 27, each opposite a port 28 passing through the outer wall of the recess 27. The grooves 32, in their lower part, each open into a cylindrical aperture 33, the axis 34 of which is inclined relative to the horizontal. The cylindrical aperture 33 opens into a rectangular slot 35 machined in the outer part of the tubular body 25 over a certain height and to a width corresponding to the diameter of the cylindrical aperture 33. When the guide ring 21 is in position in the orifice 22 in the plate 20, as illustrated in FIG. 3, the cylindrical aperture 33 opens out in the region of the lower face of the plate 20.

Figure 7:
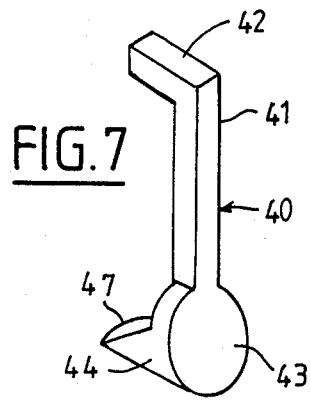
FIG. 7 is a perspective view of an attachment claw of the guide ring.

A claw 40, such as that shown in FIG. 7, is arranged in each of the cavities consisting of a cylindrical aperture 33, a slot 35, a groove 32 and the corresponding port 28. The claw 40 takes the form of a bent lever comprising a first arm 41 ending in an enlarged portion 43 and a second arm 42 forming an angle of 90° relative to the arm 41.

The enlarged portion 43 comprises a cylindrical part 44, the diameter of which corresponds to the diameter of the cylindrical aperture 33 and the axis of which is inclined relative to the horizontal and relative to the arm 41 of the bent lever. This cylindrical part 44 ends in a chamfer 47 of convex surface, forming the bearing and attachment surface of the claw 40. The convex surface 47, because of its shape, interacts perfectly with the profile of the lower surface of the hole 22.

It can be seen in FIG. 3 that, in the operating position, the arm 41 of the claw is engaged in a groove 32, the arm 42 passing through the corresponding port 28 and projecting on the outside of the tubular body 25 of the guide ring.

The claws 40 are mounted completely freely inside the tubular body 25 and are held in place in this tubular body by means of a helical spring 45 which bears at one of its ends on the bottom of the annular recess 27 of the tubular body 25 and at its other end on the arms 42 of the claws 40 by means of a bearing ring 46. The spring 45 is pre-stressed at the time of assembly, so as to exert a vertical force directed upwards on the arms 42 of the claws 40, in order to return them into an upper position, in which the enlarged portion 43 of the claw and its surface 47 project outwards relative to the outer surface of the lower part 25a of the tubular body 25.

In particular, when the guide ring is fitted in the orifice 22, as shown in FIG. 3, the spring makes it possible to lock the claw in the attachment position by means of its surface 47 on the lower edge of the orifice 22 having a frusto-conical bearing surface.

In this locking position, the cylindrical part 44 of the enlarged portion 43 partially enters the slot 35, into which the cylindrical aperture 33 opens.

The ring 21 can be released simply by pushing from the top downwards on the end of the arms 42 of the claws 40. The spring 45 is then compressed, and the enlarged end portion 43 of the claw 40 is moved downwards, so that the surface 47 is separated from the corresponding surface of the plate 20. As a result of a lever effect, since it bears on the ring 46 at the end of the spring 45, the claw 40 pivots in such a way that the enlarged portion 43 is moved towards the inside of the tubular body 25. This pivoting is possible as soon as the cylindrical part 44 of the enlarged portion 43 comes level with the cylindrical aperture 33. The claw can then be retracted completely within the wall 25a of the tubular body 25 inside the aperture 33 because of the presence of the frusto-conical surface 26a which allows the claw 40 to tilt by pivoting.

The guide ring 21 can then be extracted from the orifice 22 in the plate 20 of the tube 12. The spring is kept compressed by means of a clamping tool introduced into a notch 48 which also allows the guide ring to be gripped in order to extract it from or reinstall it in the orifice 22.

It should be noted that, in the locking position illustrated in FIG. 3, the claws 40 cannot move in the radial direction, part of the enlarged portion 43 then being engaged in the slot 35, into which opens the groove 32, the transverse dimension of which is less than the transverse dimension of the enlarged portion 43. The ring 21 can only be released by moving the claw 40 downwards counter to the force exerted by the spring 45.

When the ring 21 has been released, the claws 40 are returned to their inactive upper position, in which the arms 42, under the effect of the spring 45, bear on the upper edge of the corresponding ports 28 and under the upper rim of the closing piece 26.

To fit and lock the ring 21 in the orifice 22 in a plate 20, the claws 40 are previously retracted by pushing the end of the arms 42 and keeping the spring 45 compressed by means of a gripping tool introduced into the notch 48. The part 25a of the tubular body 25 is inserted into the orifice 22, and the shoulder of the part 25b of this tubular body comes up against the upper surface of the plate 20. The end of the arms 42 of the claws 40 is then set free, and the latter are pushed back upwards by the spring 45 which also causes these claws to tilt, in such a way that the enlarged end portion 43 is pushed outwards and its surface 47 comes in contact with the edge of the orifice 22. The guide ring 21 is then once again in its locking position, shown in FIG. 3.

It is also possible to introduce and lock the guide ring 21 without previously retracting the claws 40. The locking ring is brought into position on the orifice 22, the lower surface of the enlarged portions 43 coming up against the upper edge of the orifice 22. A push is then exerted on the end of the arms 42 of the claws 40, so as to compress the spring 45 and move the extreme end of the claws inwards. The ring 21 is snapped in and locked in this way.

The main advantages of the invention are that the device is particularly simple, its tubular body does not have any movable parts, and the locking and release operations are especially simple to carry out.

The invention is not limited to the embodiment which has been described.

Thus, it is possible to have claws and a tubular body of a form different from that described, and the angle of the arms of the lever forming the claw may be other than from 90°, and the shape of the end attachment part different from that described. Likewise, the tubular body may have slots and apertures of a different shape matching the shape of the claws used. It is possible to use a single spring common to all the claws or, on the contrary, several elastic devices, such as springs, associated with each of the claws.

The number of claws may be other than three, but there must be at least two.

The structure of the guide ring may differ from that described which had a closing piece 26 screwed on the tubular body 25, this piece 26 making it possible to fit the claws and the thrust spring easily inside an annular recess 27 of the tubular body 25. It would be just as useful to have a closing piece welded to the tubular body after the spring and claws have been fitted. It would also be possible to have a tubular piece having one or more recesses for springs bearing on the claws and having a form different from that of an annular recess.

Finally, the guide ring according to the invention can have uses other than that relating to a guide tube of a pressurized-water nuclear reactor.

I claim:

1. Removable and lockable guide ring in an orifice passing through a plate, an internal bore of the guide ring and the orifice in the plate being coaxial relative to one another, and comprising an integral tubular body a first, lower part of which enters the orifice in the plate and a second, upper part of which rests on one of the faces of the plate around the orifice, means of attaching the ring to the edges of the orifice on the face of the plate opposite the face on which the tubular body rests, and an elastic means of returning the attachment means into an attachment position for locking the ring in the orifice in the plate, wherein the attachment means comprising at least two claws each having the form of a bent lever having a first arm an end of which comprises an attachment end, and a second arm forming a predetermined angle relative to the first arm, the claws being mounted freely relative to the tubular body and being held in the tubular body by the elastic means, comprising at least one spring inserted between one part of the tubular body and the second arm of the claws, so as to push the attachment ends of the claws in the radial direction towards the ouside of the tubular body, and wherein said at least one spring is located entirely below said second arm.

2. Guide ring according to the claim 1, wherein the arms of the claws form an angle of approximately 90 degrees.

3. Guide ring according to claim 1, wherein the plate is an end plate of a guide tube of a control rod of a pressurized-water nuclear reactor, the ring having an internal bore for guiding a follower attached to the control rod.

4. Guide ring according to claim 1, wherein the wall of the tubular body has passing through it, in its first part, at least two apertures each communicating with a groove extending in the axial direction of the ring towards the second part of the tubular body, a lateral wall of which has at least two ports passing through said lateral wall in circumferential positions in line with the grooves, a claw being received in a housing comprised of an aperture, a groove and a port placed in line with one another in said axial direction, the first arm of the claw being received in the groove, and the second arm passing through the port to project in the radial direction outside the tubular body.

5. Guide ring according to claim 4, wherein the grooves open into the second part of the tubular body in an annular recess containing the spring.

6. Guide ring according to claim 5, further comprising a piece fastened rigidly to the tubular body to close off the annular recess containing the spring.

7. Guide ring according to claim 4, wherein the aperture passing through the wall of the first part of the tubular body has the form of a cylinder whose axis is inclined relative to the horizontal cross-section of the guide ring, and, on the same side as the outer surface of the first part of the tubular body, is continuous with an axially extending rectangular slot whose width is equal to the diameter of the cylindrical aperture, the end part of the claw having a cylindrical form and dimensions corresponding to those of the aperture, so that, under the action of the spring, the end attachment part of the claw is introduced into the slot, on which the end of the attachment part bears radially when the guide ring is in its locking position.

8. Guide ring according to claim 7, wherein the end attachment part has a bearing and attachment surface of convex form corresponding to the shape of a concave part of the profile of the lower surface of the plate around the orifice.

* * * * *